United States Patent

Rathgeb et al.

[11] Patent Number: 5,926,142
[45] Date of Patent: Jul. 20, 1999

[54] VEHICLE ANTENNA DEVICE

[75] Inventors: Werner Rathgeb, Esslingen; Michael Eckstein, Schwaikheim; Bernhard Funk, Geislingen/Stg.-Eybach; Marco Daum-Siegesmund, Stuttgart, all of Germany

[73] Assignee: Richard Hirschmann GmbH & Co., Germany

[21] Appl. No.: 08/925,590

[22] Filed: Sep. 8, 1997

[30] Foreign Application Priority Data

Sep. 7, 1996 [DE] Germany ............... 196 36 477

[51] Int. Cl.⁶ .................................................... H01Q 1/32
[52] U.S. Cl. ...................... 343/713; 343/711; 343/712
[58] Field of Search .................................. 343/713, 711, 343/712, 906, 872; H01Q 1/32

[56] References Cited

U.S. PATENT DOCUMENTS

| 4,845,505 | 7/1989 | Ohe et al. | 343/712 |
| 5,682,168 | 10/1997 | James et al. | 343/713 |

FOREIGN PATENT DOCUMENTS

| 03 83 017 | 8/1990 | European Pat. Off. . |
| 27 18 221 | 11/1978 | Germany . |
| 36 02 159 | 9/1989 | Germany . |
| 41 16 232 | 11/1992 | Germany . |
| 42 15 659 | 12/1992 | Germany . |
| 40 03 385 | 3/1996 | Germany . |

Primary Examiner—Hoanganh Le
Attorney, Agent, or Firm—Fulbright & Jaworski LLP

[57] ABSTRACT

An improved vehicle antenna device that reduces the cost and complexity of the antenna and its installation procedure. An antenna is mounted within the fender of a vehicle, while the antenna amplifier is mounted on the opposite side of a structural wall. The electrical connection between the antenna and its amplifier passes through a vehicle wall through a water-tight bushing. The bushing is made an integral part of the amplifier housing so that attachment of the housing to the vehicle wall causes the bushing to simultaneously penetrate an opening in the wall and seal that opening. The antenna is then plugged into an electrical connector in the bushing which is already in electrical contact with the amplifier, thus completing the installation. The water-tight seal can be improved by coating the bushing with an elastic material, by giving the bushing a slight tapered shape, or both. The antenna can be mounted within the fender on insulated mounts or by attaching directly to a fender made of non-conductive material.

20 Claims, 1 Drawing Sheet

VEHICLE ANTENNA DEVICE

BACKGROUND OF THE INVENTION

1. Field of the Invention

The invention relates to a vehicle antenna device. More particularly, the invention relates to a vehicle antenna device, its structure, and the manner in which it mounts to a vehicle.

2. Description of the Related Technology

This invention pertains to a vehicle antenna device comprising an antenna, an amplifier in an amplifier housing, and the electrical and mechanical components necessary to connect the antenna to the amplifier and enable them to work properly in a vehicle. In the prior art, these elements are typically arranged with the antenna outside a vehicle chassis wall, the amplifier located inside this wall, and the two connected via a shielded cable which passes through a water-tight bushing in the wall. Such a vehicle antenna device is already known from German patent application DE 40 03 385 A1. In this known antenna configuration, sometimes called a bumper antenna, there are two antennae that are arranged in the corner areas of the bumper and which are connected via a phase-shifter line, as well as an amplifier whose housing is mounted on the inside of the vehicle body wall. The antennae are connected to an amplifier input that is designed with a mating connector via a cable. The cable runs through a bushing that is installed in a grommet opening in the vehicle body wall and a plug connector at the end of the cable plugs into the amplifier. To protect against electromagnetic interference (EMI) from the engine compartment, this cable must be shielded and its shield connected to the chassis. This known device for sending and receiving radio-frequency signals is expensive to manufacture and install for several reasons.

First, to protect against spurious radiation from the engine compartment, the cable has to consist of a shielded line whose shield is conductively connected to the vehicle body. This increases material costs and installation steps.

Second, the bushing is installed as a separate part, increasing parts count and installation steps.

Third, installation is overly complex because it involves too many individual steps: first, the antennas are attached to the bumper along with the phase-shifter line; then the amplifier housing is mounted on the vehicle body wall; then, in succession, the bumper is brought up to the vehicle body, the cable is run through the grommet in the vehicle body wall, the bumper is mounted, the bushing is attached to the cable and then inserted into the wall opening, and finally the cable plug is plugged into the amplifier socket.

SUMMARY OF THE INVENTION

This invention is an improvement over previous vehicle antenna devices, with the main components being an antenna, an amplifier, and the associated electrical and mechanical components that physically mount and electrically connect the antenna and amplifier. The antenna is a conductive structure which is arranged at or in an external vehicle part such as a fender, while the antenna amplifier is located inside the vehicle. The two are connected via a bushing that carries the electrical connection through a grommet opening in the vehicle body wall and provides a water-tight seal for that opening. The bushing is made as part of the amplifier housing and is designed in such a way that it passes through and seals the grommet opening when the amplifier housing is attached to vehicle body wall. As used here, the term "grommet" implies that the opening is reinforced with a strengthening or insulating material, which is the normal practice for electrical cable access holes. But the invention will work equally well without such reinforcement.

Compared to the known bumper antenna, the invention achieves a simpler structure and reduced installation cost, as well as greater flexibility for post-manufacturing installation or repair. These advantages can all have a favorable impact in mass-production environments.

In a preferred embodiment, the antenna is arranged on the inside of a fender, is equipped with a plug connector at the end, and plugs directly into the bushing without any intermediate cable. The bushing and amplifier housing form a single composite assembly which is attached to the wall and seals the opening in a single operation.

An object of the invention is thus to create a vehicle antenna device which is as simple and cost-effective as possible in terms of structure and installation and which at the same time ensures good water-tightness of the vehicle body grommet and minimal radiation of noise signals from the engine compartment.

This object is accomplished by means of the invention described herein. It provides a simple way of insuring that the bushing, as a loose part, does not increase the costs of storage, preparation, or installation. Also, the installation of the vehicle antenna device is greatly simplified because the act of attaching (for example, with screw fasteners) the amplifier housing to the inside of the vehicle wall simultaneously forces the bushing into the grommet opening in such a way that it effectively seals the opening against spray and splashed water. The sealing effect can be easily adapted to the requirements of the particular case by properly selecting the shape and material of the bushing. The high force with which the bushing can be forced into the grommet opening when the housing is screwed on makes it unnecessary to use a bushing with a complex shape. (By comparison, with prior art techniques the bushing is installed as a separate piece and contains the cable at the time of insertion. This complicates the procedure and limits the technique to steps that won't damage or place undue stress on the cable.) In addition, installation does not need to involve bringing the vehicle part which supports the antenna up to the vehicle body; rather, installation of the antenna can be accomplished with that vehicle part already attached. It is even possible for the support to be designed as an integral part of the body.

Taken altogether, several of the installation steps that were previously required have been eliminated, an advantage that makes itself felt both when mass-produced vehicles are originally assembled and upon retrofitting.

Overall, the invention achieves a simple and cost-effective structure and a quick and uncomplicated installation. At the same time, good water-tightness at the grommet opening in the vehicle body wall and minimal EMI from the engine compartment are achieved because the connecting cable is eliminated and because the antenna is shielded from the engine compartment by the vehicle body bulkhead.

DETAILED DESCRIPTION OF THE PREFERRED EMBODIMENT

Figure 1:
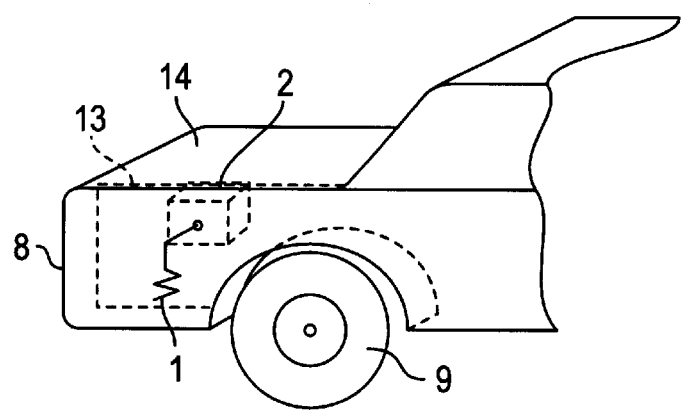
FIG. 1 shows a perspective view of the invention in the front part of a vehicle.
Figure 2:
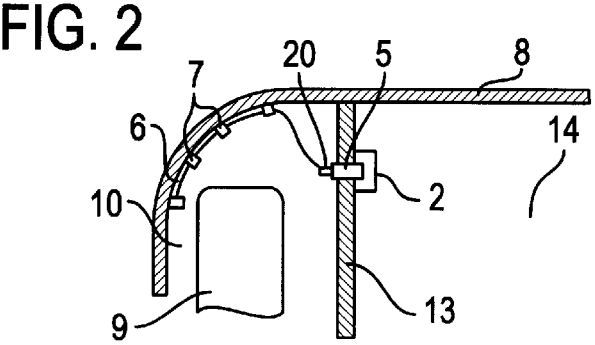
FIG. 2 shows a cross-sectional view through the wheel well of the vehicle.
Figure 3:
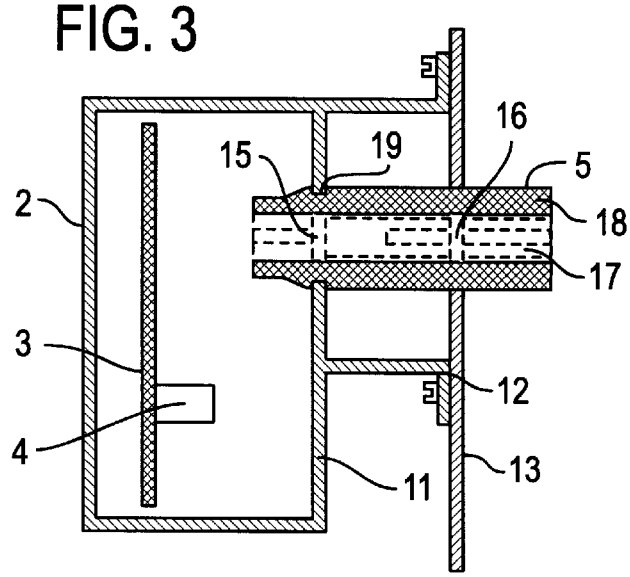
FIG. 3 shows a detailed cross-sectional view of the amplifier housing and bushing.

The antenna device of the present invention overcomes the disadvantages of the prior art through improved location of the components and an improved design of the bushing. In a preferred embodiment, the antenna is located in a fender and the amplifier housing is mounted directly to the interior side of a vehicle wall. The bushing design provides advantages in three areas: 1) The bushing is attached to the amplifier housing, allowing both to be installed in a single step. 2) Since it contains no cable at the time of installation, the bushing can be inserted into the grommet opening with considerable force, resulting in a superior seal. 3) The bushing contains the electrical connector to the amplifier, allowing the antenna to be connected after all other assembly has been completed.

Attaching the bushing to the amplifier housing forms a housing assembly. Mounting this housing assembly to the wall allows the amplifier housing to be attached to the wall and the grommet opening to be sealed with the bushing, all in a single operation. This attachment of bushing to housing can be achieved in numerous ways, including the use of a circumferential groove in a grommet opening in the housing which allows the bushing to be screwed into the housing. Of course, the bushing can also be manufactured as a composite part of the housing to save another assembly step. Since the outer surface of the bushing must be somewhat deformable to provide a proper seal, this composite approach encourages the use of plastic or other non-conductive material in the housing assembly. In such a case the housing can then be coated with a metallic material to shield against spurious radiation.

The location of the antenna is also important. Arranging the antenna in a fender rather than in the bumper offers several advantages. The antenna can be placed close enough to the amplifier housing so that it can connect directly to the amplifier without an intermediate cable. It can also be placed far enough away from the vehicle wall and high enough above the ground so that it can efficiently receive and transmit signals without being shielded by the vehicle chassis. This in turn allows the use of a single antenna for omnidirectional receiving/transmitting, rather than the two antennae with phase-shifter line required by the prior art.

If the fender is damaged (i.e., in an accident), only the inexpensive antenna is at risk, while the amplifier and bushing are protected by the more substantial body wall.

In addition, attaching the antenna in or on a fender greatly reduces EMI noise signals from the engine compartment, which is shielded by the vehicle body wall. Such noise signals can reach bumper antennae to a much greater extent via the brake lines, electric lines, and the exhaust at the underside of the vehicle.

Placing the antenna within the fender removes it from the view of passers-by, which reduces the chance of damage due to vandalism, and also protects it against damage from flying debris such as stones thrown by other vehicle tires. These advantages accrue without placing any significant constraints on the design of the wheel-well shell.

It is also possible to manufacture the antenna directly into the fender by methods such as casting, which would protect the antenna against corrosion, but this approach is suitable only when vehicles are originally assembled. Subsequent repair or retrofit of the antenna would be more difficult.

Arranging the antenna directly on or at the inside surface of the fender is particularly cost-effective because the fender itself can provide the supporting structure needed to maintain the physical configuration of the antenna. The antenna itself can take several forms. The least expensive is a single wire because this is the easiest to manufacture. An antenna in the form of a foil is an alternative that is somewhat more expensive to manufacture, but simple to install. In either case, insulated mounting supports can maintain electrical isolation between the antenna and a metal fender. The installation of either form of antenna can be facilitated if the manufacturer attaches the mounting supports to the inside of the fender at the time the vehicle or fender is manufactured. This approach allows efficient antenna installation by either the manufacturer or by subsequent post-manufacture dealers. Alternatively, if the fender is made of non-conductive material, no electrical insulation is needed and the antenna can be mounted directly to the fender without any insulating structures.

Because the signals between the antenna and amplifier do not have to travel through the engine compartment, it is no longer necessary to have a shielded line between the antenna and the amplifier. Rather, the end part of the antenna, which normally consists at least partially of wire, can be run directly to the grommet opening. The absence of a shielded cable reduces the cost and effort involved in installing the vehicle antenna device even further.

Minimal noise radiation into the vehicle antenna device is further improved if, in addition to arranging the antenna in the fender as described above (and thus separating it from the engine compartment by a vehicle body wall), the amplifier housing is made of metal and is connected to the conductive vehicle body. This shields that portion of the antenna signal path that is contained within the amplifier housing.

To further improve ease of installation, the bushing can be designed as a plug connector which is electrically connected to the amplifier. This allows the antenna to be plugged directly into the bushing from the interior of the fender well without the need to pass the antenna or a connecting cable through the vehicle body wall before connecting it to the amplifier. This allows the antenna to be simply and easily connected at any time after the vehicle is assembled. It also allows the bushing to be inserted into the grommet opening with greater force, since there is no concern with damaging "soft" components such as shielded cables.

When this approach is used, a compromise must be struck in the selection of the material for the bushing because the material must have both sufficient internal strength to be designed as a plug connector and sufficient external elasticity to ensure effective sealing of the grommet opening. This problem can be solved in a particularly advantageous way by spraying or otherwise coating the bushing with a substance that is somewhat elastic and is therefore suitable for sealing purposes. This approach also makes it possible to choose a mass-produced, commonly-available plug connector as a bushing rather than custom designing the part, because the sprayed-on material can provide the sealing characteristics that might not be inherent in the connector plug itself. Alternately, a connector can be mounted inside a hollow bushing, and if necessary an elastic coating applied to the connector/bushing interface.

The sealing characteristics of the bushing can be further enhanced if the bushing has a somewhat conical shape that tapers away from the amplifier housing. This shape causes the bushing to be firmly forced against the edges of the grommet opening when the amplifier housing is pushed against the vehicle body wall.

A better understanding of the invention can be obtained from a more detailed description of a preferred embodiment shown in the drawings and described below:

The vehicle antenna device consists of an antenna 1, a radio frequency amplifier, which is arranged in a metal housing 2, with circuit components mounted on a printed circuit board 3 (for example, a transistor 4), as well as a bushing 5 for the water-tight passage of an electric connection from antenna 1 to the amplifier.

The antenna is designed as wire 6, which is attached with spacers 7 to the inner surface of fender 8, which is made of plastic and covers wheel housing 10, which houses left front wheel 9.

Metal amplifier housing 2 is screwed to the inner surface of a vehicle body wall 13 with spacer bridges 12, which protrude from its base wall 11, and the vehicle body wall separates engine compartment 14 from wheel well 10.

In base wall 11 of amplifier housing 2 and in vehicle body wall 13 that is separated from it by bridges 12 are two aligned grommets 15, 16 in which bushing 5 is arranged.

The bushing comprises socket 17, and is coated with a material 18 that has elastic properties. The bushing is fastened into grommet 15 of amplifier housing 2 with circumferential groove 19. Sprayed-on material 18 tapers down toward the other end in a conical shape.

On the antenna side, wire 6 is equipped with a plug 20, which can be plugged into socket 17.

When the vehicle antenna device is installed, metal housing 2 with attached bushing 5 is first attached onto vehicle body wall 13 with screws, whereby the sprayed-on material, which acts as a seal, is forced by its conical shape into the edge zone of grommet opening 16 of vehicle wall 13 so firmly that good water-tightness is achieved. Because of this good seal, the seal between bushing 5 and grommet 15 of base wall 11 does not have to be water tight, and can be produced with less expensive methods.

In a separate installation step, wire-shaped antenna 6 is attached to the inside of fender 8 by means of spacers 7.

The final installation step consists of plug 20, which is mounted on one end of wire 6, being plugged into socket 17.

These steps are all that is required to ensure the complete installation of the vehicle antenna device. Because the connecting cable is now unnecessary, and because the amplifier housing 2, bushing 5 and socket 17 are all installed with a single attachment procedure which simultaneously provides a water-tight seal, the structure and installation of this device are made considerably simpler and cheaper than that of the bumper antenna known in the art.

Because it is arranged under the fender, the antenna is so far above the ground that, compared to the known bumper antenna, the higher field intensity ensures that only one antenna is needed rather than two antennae with a phase-shifter line. In addition, in this location the noise radiation from the engine compartment is minimized by vehicle body wall 13, and the danger of fouling and damage is considerably reduced. Moreover, in the event of deformations of fender 8 (e.g., caused by accidents), the sealing action of the bushing in the grommet opening of the vehicle body wall is not impaired. Finally, the antenna is largely protected against vandalism due to the fact that it is not visible from the outside, and the ability to freely select the shape of fender is not hampered.

This invention may be carried out in specific ways other than those set forth here without departing from the spirit and essential characteristics of the invention. Therefore, the presented embodiments should be considered in all respects as illustrative and not restrictive, and all modifications falling within the meaning and equivalency range of the appended claims are intended to be embraced herein.

We claim:

1. A vehicle antenna device in a vehicle having an internal part and an external part separated by a wall, said vehicle antenna device comprising:

an amplifier housing mounted on said wall;

an amplifier contained within the amplifier housing;

a wall grommet opening in said wall;

a bushing forming an integral part of said amplifier housing and adapted for fitting snugly into said wall grommet opening to form a seal with said wall grommet opening; and an antenna comprising a conductive structure electrically connected to said amplifier through said bushing.

2. The vehicle antenna device of claim 1, wherein:

said amplifier housing comprises an electrically conductive material; and said amplifier housing is electrically connected to said vehicle body wall when said amplifier housing is mounted on said vehicle body wall.

3. The vehicle antenna device of claim 1, wherein:

said amplifier housing further comprises a housing grommet opening;

said housing grommet opening comprises a circumferential groove;

said bushing is adapted to be screwed into said housing grommet opening by means of said circumferential groove.

4. The vehicle antenna device of claim 3, wherein:

said antenna further comprises a first connector;

said bushing comprises a second connector electrically connected to said amplifier;

said first connector is adapted to mate with said second connector to provide electrical connection between said antenna and said amplifier.

5. The vehicle antenna device of claim 3, wherein said bushing is coated with an elastic sealing material, said elastic sealing material adapted to provide a tight seal when said bushing is inserted into said wall grommet opening.

6. The vehicle antenna device of claim 3, wherein said bushing has a tapered conical shape, said conical shape tapering away from said amplifier housing.

7. The vehicle antenna device of claim 1, wherein said antenna is arranged within said external part.

8. Vehicle antenna device of claim 7, wherein said antenna is arranged at a point within said external part which is not visible from outside the vehicle.

9. The vehicle antenna device of claim 7, wherein the antenna comprises a wire.

10. The vehicle antenna device of claim 7, wherein the antenna comprises a conductive foil.

11. The vehicle antenna device of claim 7, wherein said antenna is configured for mounting to the interior surface of said external part.

12. The vehicle antenna device of claim 11, wherein said antenna further comprises an insulated base, said insulated based being configured for attachment to said external part.

13. The vehicle antenna device of claim 7, wherein said external part comprises non-conductive material.

14. The vehicle antenna device of claim 13, wherein said antenna is configured for attachment directly on the non-conductive material of said external part.

15. A method of assembling a vehicle antenna device in a vehicle with a wall between the interior and exterior portions of the vehicle, said method comprising the steps of:

providing a housing assembly comprising an amplifier, an amplifier housing, and a bushing;

assembling said amplifier housing and said bushing into a single unit by attachable inserting said bushing into a housing grommet opening in said amplifier housing;

providing a wall grommet opening in said wall;

attaching said housing assembly to the interior side of said wall in a manner that causes said bushing to create a seal with said wall grommet opening; and electrically connecting said antenna to said amplifier at said bushing.

16. The method of claim 15, wherein the step of providing a housing assembly further comprises the step of providing a bushing with a tapered conical shape.

17. The method of claim 15, wherein the step of providing a housing assembly further comprises the step of manufacturing said amplifier housing and said bushing as a single unit.

18. The method of claim 15, wherein the step of providing a housing assembly further comprises the step of coating said bushing with an elastic material.

19. The method of claim 15, wherein the step of attaching said housing assembly further comprises the steps of:

inserting said bushing into said wall grommet opening;

fastening said amplifier housing to the interior side of said wall in a manner that causes said bushing to press firmly against the inner edges of said wall grommet opening.

20. The method of claim 15, wherein the step of electrically connecting said antenna further comprises the steps of:

providing a first connector on said antenna;

providing a second connector within said bushing, said second connector being electrically connected to said amplifier;

connecting said first connector to said second connector.

* * * * *